(12) United States Patent
Gacek

(10) Patent No.: US 6,795,205 B1
(45) Date of Patent: Sep. 21, 2004

(54) THIRD-PARTY AUTHORIZATION FOR HOME-BASED PRINTING

(75) Inventor: Paul Nicholas Gacek, Laguna Beach, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/526,475

(22) Filed: Mar. 15, 2000

(51) Int. Cl.[7] .......................... G06F 15/00; G06F 17/60; G06F 17/00; H04L 9/00
(52) U.S. Cl. .......................... 358/1.15; 705/14; 705/78; 705/79; 705/400
(58) Field of Search .............................. 725/2; 358/1.1, 358/1.6, 1.9, 1.13, 1.15, 434, 435, 436, 437, 438; 707/10; 709/217; 705/51, 52, 53, 78, 79, 14, 400

(56) References Cited

U.S. PATENT DOCUMENTS

| | | | |
|---|---|---|---|
| 5,721,827 A | * 2/1998 | Logan et al. | 709/217 |
| 5,761,669 A | 6/1998 | Montague et al. | 707/103 |
| 5,793,414 A | * 8/1998 | Shaffer | 725/133 |
| 5,855,007 A | * 12/1998 | Jovicic et al. | 705/14 |
| 5,930,810 A | 7/1999 | Farros et al. | 707/506 |
| 5,956,487 A | 9/1999 | Venkatraman et al. | 395/200.48 |
| 5,956,715 A | 9/1999 | Glasser et al. | 707/9 |
| 5,960,168 A | 9/1999 | Shaw et al. | 395/114 |
| 5,987,228 A | 11/1999 | Nishizawa | 395/114 |
| 6,327,045 B1 | * 12/2001 | Teng et al. | 358/1.15 |
| 6,408,286 B1 | * 6/2002 | Heiden | 705/408 |
| 6,452,689 B1 | * 9/2002 | Srinivasan | 358/1.15 |
| 6,552,813 B2 | * 4/2003 | Yacoub | 358/1.1 |

FOREIGN PATENT DOCUMENTS

EP 1 071 254 1/2001

OTHER PUBLICATIONS

"Powering the eFuture!", insci–statement.com Main, http://www.insci.com/homeh.html, Oct. 26, 1999—INSCI Corp. Reports Second Quarter, Six Month Results.

* cited by examiner

Primary Examiner—Edward Coles
Assistant Examiner—Chan S. Park
(74) Attorney, Agent, or Firm—Fitzpatrick, Cella, Harper & Scinto

(57) ABSTRACT

Authorized transmission of print data from an internet application to a home access device having a printer connected thereto, the printer being serviced by a remote print server which controls data transmission to the home access device, in which authorization is obtained from an intermediary service for the internet application to transmit the print data to the home access device via the remote print server, and in which the authorized print data is transmitted to the home access device via the remote print server for printing on the printer.

21 Claims, 9 Drawing Sheets

THIRD-PARTY AUTHORIZATION FOR HOME-BASED PRINTING

INCORPORATION BY REFERENCE

U.S. patent application Ser. No. 09/357,431, entitled "Software Architecture for Cable Television Home Printing", U.S. patent application Ser. No. 09/357,433, entitled "Internet-Based Push Printing Over Cable Network", and U.S. patent application Ser. No. 09/357,593, entitled "Secure Printing Over Cable Network to Home Printer", all of which are incorporated herein by reference.

BACKGROUND OF THE INVENTION

1. Field of the Invention

The present invention relates to a system for authorizing the transmission of print data generated by a third-party application over a network to a home access device for printing on a printer which is connected to the home access device. More specifically, the present invention provides a mechanism for an internet application to obtain authorization for the transmission of print data which is generated by the internet application over a cable network to a set-top box of a cable subscriber for subsequent printing on the cable subscriber's printer which is connected to the set-top box.

2. Description of the Related Art

Generally, the increasing use of the internet has resulted in the proliferation of web sites which provide various services for access by the home consumer. Such web sites implement internet applications including credit card services, utility billing and other billing statements, and merchants which sell goods and services over the internet.

Typically, a home consumer accesses these internet applications through the use of a home personal computer (PC) which is connected to the internet via a gateway such as an ISP (internet service provider). In this manner, data such as coupons, sales information, advertisements, billing statements and financial statements can be accessed from the internet, downloaded and then printed by the consumer on a printer attached to the consumer's home PC.

In addition to the widespread use of home PCs to access the internet, the use of devices known as set-top boxes for connecting a common television to a digital cable network has been recently increasing. Typically, the digital cable network comprises a digital broadband network which incorporates digital and analog services such as analog and digital television signal broadcasts, analog and digital pay-per-view services, digital near video on demand, and one and two way real time data communication. Such digital cable networks also provide services such as web browsing and e-mail by providing access to the internet through a proxy between the internet and the digital cable network.

The typical digital cable network has a cable head end which collects value added services for distribution over the digital cable network, including television stations, pay-per-view television stations, near video on demand, web browsing and e-mail. The cable head end also implements network control systems which are required to manage the distribution and control of the aforementioned services over the digital cable network. The cable head end of a typical digital cable network has the capacity to provide services for as many as one-half to one million homes. Through the use of numerous hubs, each of which provides service to approximately 500 to 2,000 homes. The set-top box within each home communicates with the cable head end through a client/server relationship. The STB (set-top box) hosts various applications that present the user with the functionality offered by the various cable services. The more familiar applications provided over such digital cable networks are a navigator, an interactive program guide, e-mail, and a web browser. In such applications, the STB hosts the client software and the cable head end hosts the server software. The set-top box itself may be one of many currently available set-top boxes, such as the Explorer 2000 by Scientific Atlanta, the DCT 5000+ by General Instrument, and the Streammaster by Motorola.

Thus, home consumers with set-top boxes may access various internet services, such as financial institutions, credit card services and on-line merchants via the internet proxy provided by the cable head end of the digital cable network. The home consumer can browse the various web sites provided by such internet services and through the use of the consumer's television via the consumer's set-top box.

Recently, techniques have been developed for providing a printing service between internet applications and a home subscriber's set-top box to allow for print data from an internet application to be printed on a home subscriber's printer which is connected to the set-top box. Such techniques are described in the aforementioned U.S. patent applications Ser. No. 09/357,431, entitled "Software Architecture for Cable Television Home Printing," Ser. No. 09/357,433, entitled "Internet-Based Push Printing Over Cable Network to Home Printer", and Ser. No. 09/357,593, entitled "Secure Printing Over Cable Network to Home Printer."

The inventions described in these patent applications provide a system for an internet application that is maintained by a bank, credit card service or on-line merchant to have the capability to provide consumer-related data to a consumer on a regular basis, such as a banking statement or utility bill, by initiating transmission of such consumer-related data over the digital cable network to the consumer's set-top box. For example, monthly banking statements which are typically sent by mail can be replaced with monthly transmissions of such banking statements to the consumer's set-top box in the consumer's home. Such consumer-related data can then be automatically printed on a printer attached to the set-top box so that the consumer does not need to be involved in the printing process. Due to the confidential nature of such consumer-oriented information, such printing which is initiated by the internet service can be handled in a secure manner so that no other subscriber to the digital cable network could access or intercept such information and so that the information is delivered to the appropriate set-top box.

In light of the foregoing patent applications, it can be appreciated that a home user with a printer can obtain and print information from a variety of internet-based applications, regardless of whether the home user's computing platform is a PC connected to the internet via an ISP or a set-top box connected to the internet via a cable network. In a similar manner, print data can be sent to the home user's printer from such internet-based applications, thereby providing the home user with useful information without the home user having to be involved in the printing process.

In general, a home-based printer can be attached to a home computing platform such as a PC, a television set-top box or a residential gateway. In this manner, a third party such as an internet application can "push-print" a print job through another network to the home user's printer. For example, a third party such as a merchant may initiate a print job containing an advertisement or a coupon for printing on the home user's printer. Furthermore, the home user may subscribe to one or more particular web sites for scheduled automatic printing of requested information from the web site to the home user's printer. It can therefore be appreciated that a home printing service infrastructure as described in the aforementioned patent applications provides a valuable network centric system whereby print jobs can be sent from a third-party merchant on the internet to the printer of a home user via a network server between the internet and the home computing platform of the home user, wherein the network server and the home computing platform are connected by a network other than the internet.

Regardless of the specific type of home computing platform utilized by the home user, third-party merchants or vendors would be able to initiate a print job for printing on the home user's printer via the home printing service infrastructure. In many instances, this service is of value to the home user, such as when coupons and/or advertisements in which the home user is interested are provided to the home user, or when a utility company or a financial institution with which the home user does business provides a billing statement to the home user.

In several other instances, however, it can be appreciated that third-party-initiated print jobs may be undesirable. For instance, a large number of merchants with internet access to the home printing service infrastructure may initiate an overwhelming number of print jobs to a home user's printer, thereby resulting in unwanted and voluminous printout. In addition, even for those print jobs in which the home user may have an interest, such as coupons, billing services and financial statements, the printing of such print jobs costs the home user money in the form of ink and paper, especially when such print jobs are sent on a frequent basis.

Therefore, there is a need for a mechanism whereby third-party-initiated print jobs to a specific home user can be either blocked entirely, regulated by volume or allowed only when paid for by the initiating third party. Specifically, it is desirable to require that the third parties pay an authorization fee in order to obtain authorization to send a print job to the home user's printer.

SUMMARY OF THE INVENTION

The present invention addresses the foregoing problems by providing a mechanism for an internet application to obtain authorization for the transmission of print data which is generated by the internet application over a cable network to a set-top box of a cable subscriber for subsequent printing on the cable subscriber's printer which is connected to the set-top box.

In one embodiment of the invention, a method is provided for authorized transmission of print data from an internet application to a home access device having a printer connected thereto, the printer being serviced by a remote print server which controls data transmission to the home access device, wherein the method includes the steps of negotiating with an intermediary service to obtain authorization for the internet application to transmit the print data to the home access device via the remote print server, and transmitting, in the case that the authorization is obtained, the authorized print data from the internet application to the home access device via the remote print server for printing on the printer.

Preferably, authorization is obtained from an intermediary service for the internet application to transmit the print data only if a payment is first negotiated to the intermediary service from the internet application. The payment is preferably transferred from the intermediary service to the user of the home access device to compensate the user for the ink and paper that are consumed when printing the print data on the home user's printer.

By virtue of this arrangement, a method is provided whereby third-party-initiated print jobs to a specific home user can be blocked unless payment is provided by the initiating third party to compensate the home user for the ink and paper used during printing of the print job.

In another embodiment of the invention, a method is provided for authorized transmission of print data from an internet application residing on a first network to a home access device residing on a second network, the home access device having a printer connected thereto, the second network having a print server which interfaces the first network to the second network and which controls data transmission to the home access device. Print data is generated by the internet application and an intermediary service is contacted to obtain authorization for the internet application to transmit the print data to the home access device via the print server. A payment amount is negotiated between the intermediary service and the internet application for the authorization to transmit the print data. Authorization is provided from the intermediary service to the internet application to transmit the print data to the home access device via the print server. A notification is sent from the intermediary service to the print server that the intermediary has authorized the internet application to transmit the print data to the home access device. The print data is then transmitted from the internet application to the home access device via the print server for printing on the printer.

Preferably, the payment is negotiated based on the number of pages to be printed and the type of paper to be printed. The payment is preferably transferred from the intermediary service to the user of the home access device to compensate the user for the ink and paper that are consumed when printing the print data on the home user's printer.

By virtue of this arrangement, a mechanism is provided whereby third-party-initiated print jobs to a specific home user can be blocked unless compensation is provided by the initiating third party for the ink and paper used to print the print job.

In yet another embodiment of the invention, a method is provided for authorizing the transmission of print data from an internet application residing on a first network to a home access device residing on a second network, the home access device having a printer connected thereto, the second network having a print server which interfaces the first network to the second network and which controls data transmission to the home access device. A request is received from the internet application for authorization to transmit the print data to the home access device via the print server. Authorization is provided to the internet application to transmit the print data to the home access device via the print server. The print server is notified that the internet application is authorized to transmit the print data to the home access device.

Preferably, authorization is only provided after a payment amount is negotiated from the internet application to the intermediary service. The payment is preferably negotiated based on the number of pages to be printed and the type of paper to be printed. The payment is preferably transferred from the intermediary service to the user of the home access device to compensate the user for the ink and paper that are consumed when printing the print data on the home user's printer.

By virtue of this arrangement, a mechanism is provided controlling access to the home access device of a user whereby third-party-initiated print jobs to a specific home user can be blocked unless compensation is provided by the initiating third party for the ink and paper used to print the print job.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
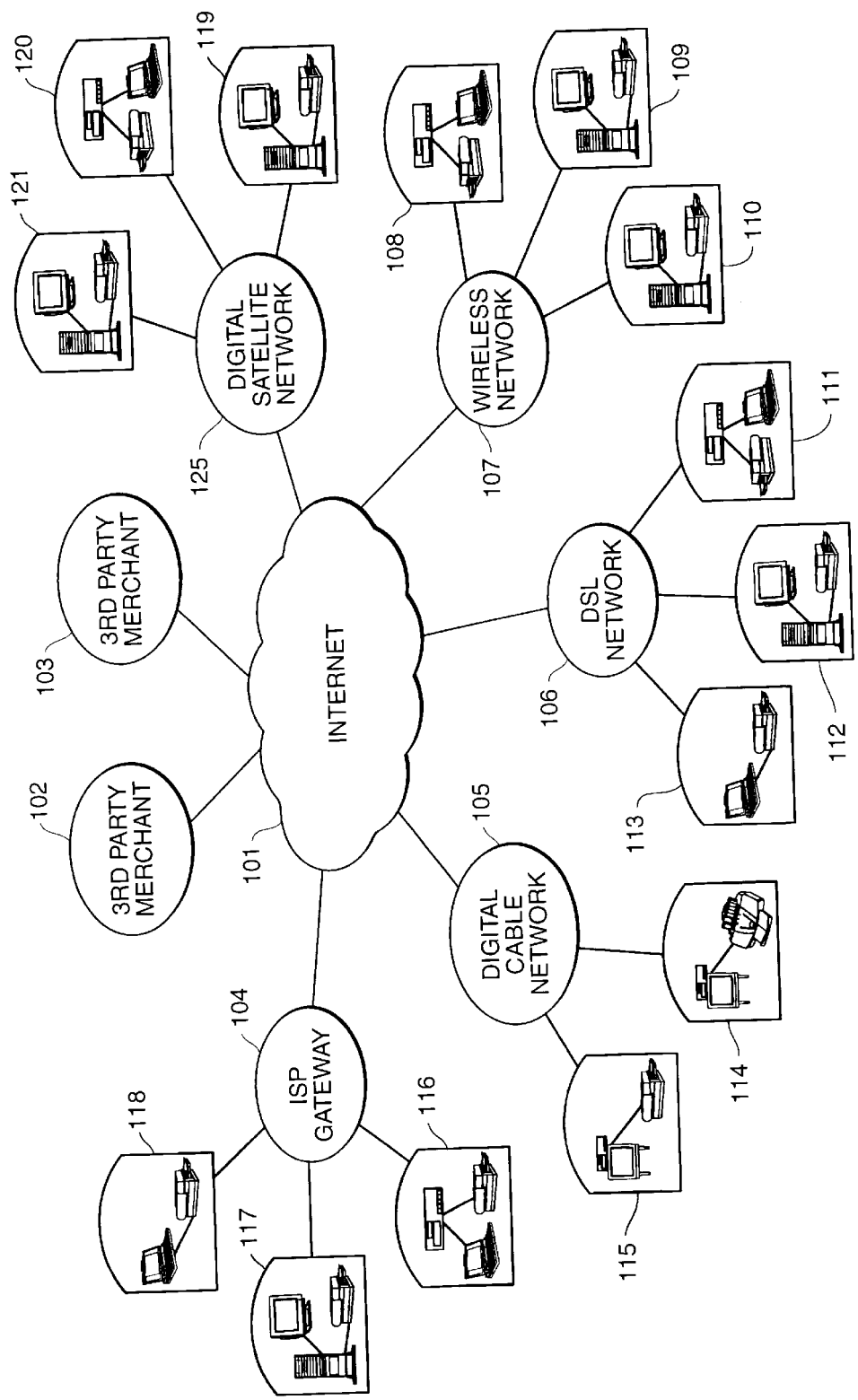
FIG. 1 is a diagram for explaining the networking environment in which one embodiment of the present invention is practiced.

FIG. 1 illustrates a broad overview of a networked environment in which the present invention is practiced. The networked environment includes internet 101 as well as several other networks which are connected to internet 101, including ISP gateway 104 for providing internet connectivity to home users 116 to 121. The networked environment also includes digital cable network 105 which provides digital cable services to a large number of homes, including for example those of home users 114 and 115. Digital cable network 105 includes value-added service provider systems such as network broadcasting and movie channel services, as well as other digital-based services such as digitally-transmitted music and digital modem service to connect personal computers of home users to digital cable network 105. In addition, digital cable network 105 includes the ability to provide internet services the home users via specialized set-top boxes in the homes of home users, such as home users 114 and 115. Each of the set-top box provides internet access on the television of the respective home user.

The networked environment of FIG. 1 also includes DSL network 106 for providing high-speed internet access to homes 111 to 113. As depicted in FIG. 1, home users 111 to 113 may have PCs for connection to DSL network 106 for accessing internet 101, or may include other home access devices, such as a residential gateway device which acts as a local access gateway within the residence of the home to provide access to other computing devices and peripherals within the home. In a similar manner, wireless network 107 provides high-speed wireless connectivity to home users 108 to 110, and digital satellite network 125 provides high-speed connectivity to home users 119 to 121, for providing access to internet 101. As with DSL network 106, home users 108 to 110 and 119 to 121 can have PCs or residential gateways which are connected to wireless network 107 and digital satellite network 125 which act as gateways to internet 101, thereby providing internet access to home users 108 to 110 and 119 to 121, respectively.

It can be appreciated that the foregoing is simply one illustration of a networked environment in which the present invention can be practiced. In addition to utilizing PCs, set-top boxes and/or residential gateways within each of the homes depicted in FIG. 1, other typical computer-related peripherals and devices can be provided in the homes of home users 108 to 121. One of the most common peripherals for use in conjunction with a home computing device or other home access device, is a printer. It can be appreciated that a particular home may have more than computing device within the home in addition to having more than one printer within the home. For examples, home users 114 and 115 have set-top boxes for connection to digital cable network 105 and have printers which are connected to the set-top boxes. In this manner, home users 114 and 115 can access internet 101 via digital cable network 105 and can initiate a print job of selected items from internet 101 on the home users' local printers. The manner in which a home user with a set-top box can receive a print job initiated by a third-party internet application via internet 101 and digital cable network 105 is described in more detail below.

Also provided in the networked environment depicted in FIG. 1 are third-party merchants 102 and 103 which are representative of the myriad of web sites available on the internet which provide information, e-commerce and/or services of interest to home users 108 to 121. For instance, third-party merchants 102 and 103 may provide banking or financial services which are utilized by certain home users, such as home users 114 and 115. It can be appreciated that, in addition to the ability of home users 108 to 121 to access third-party merchants 102 and 103 via internet 101 and their respective network hub, such as ISP gateway 104, digital cable network 105, DSL network 106, wireless network 107 or digital satellite network 125, third-party merchants 102 and 103 may also wish to initiate print jobs directly to the aforementioned home users. For example, third-party merchant 102 may be a bank internet application that wishes to send a monthly financial statement to home user 115. In particular, third-party merchant 102 sends a print job representing a financial statement via internet 101 and digital cable network 105 to the set-top box of home user 115 for printing on a printer of home user 115. This is referred to as "push-printing". Moreover, third-party merchants 102 and 103 may wish to utilize distributed printing whereby one particular print job, such as a discount coupon for the merchant's services, is distributed to multiple home users for printing on printers of the home users. In this manner, a targeted "mass mailing" approach can be initiated by third-party merchants 102 and 103 without the need for printing a large volume of such coupons and then mailing the coupons.

To achieve such a distributed push-printing network environment such as digital cable network 105, a particular network architecture is utilized which supports sending a print job initiated by a third party with access to the internet via digital cable network 105 to each home user's printer. In this regard, U.S. patent application Ser. No. 09/357,431, "Software Architecture for Cable Television Home Printing", and U.S. patent application Ser. No. 09/357,433, "Internet-based Push Printing Over a Cable Network", describe an architecture for supporting "push-printing" from a merchant or other third-party internet application to a home printer connected to a set-top box residing on a digital cable network. The architecture described in the aforementioned applications supports initiation of a print job from a third-party internet application, such as a merchant, directly to a printer connected to the set-top box of a home user, ordinarily without intervention from the home user. In this manner, merchants with internet access, or other internet entities, may push-print personal print data, such as a financial statement, to a specific home user, or may push-print non-personal print data, such as a coupon or advertisement, to multiple targeted home users.

Figure 2:
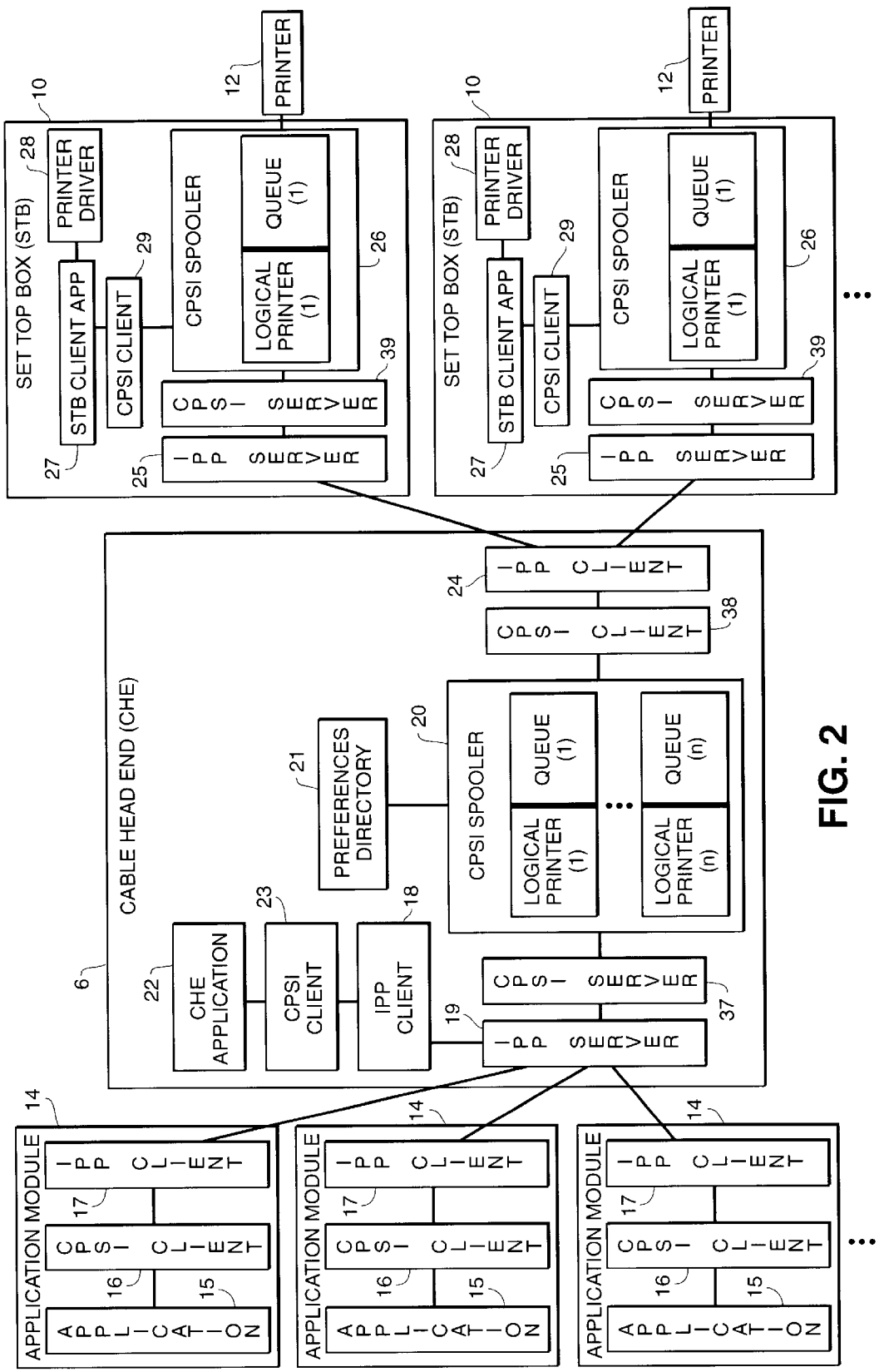
FIG. 2 is a diagram for explaining an architecture for supporting push-printing according to one embodiment of the present invention.

The architecture described in the aforementioned U.S. patent applications describes a system in which third-party merchant 102 can transmit a targeted print job via internet 101 to digital cable network 105 for receipt by a set-top box of home user 115 and then subsequent printing on a printer of home user 115. In particular, digital cable network 105 includes cable head end (CHE) 6 which controls digital cable transmission to multiple home users, such as home users 114 and 115. As seen in FIG. 2, CHE 6 is accessible to third-party internet applications via an internet connection to application modules 14, each of which resides in a respective third-party internet application on internet 101. Application modules 14 may represent internet applications such as banks, financial institutions, e-commerce web sites and utility companies, in addition to many other product- and/or service-related entities having internet access. Each application module contains internet application 15 which represents the particular application of the internet application, such as a bank or other service, and CPSI client 16 which is necessary to communicate with CPSI server 37 of CHE 6 to support push-printing to a printer of a home user. Also included in application module 14 is IPP client 17 which supports the internet printing protocol (IPP) for transmission of a print job to IPP server of CHE 6.

As shown in FIG. 2, CHE 6 includes IPP server 19 for supporting IPP client 17, and also includes CPSI server 37 for supporting CPSI client 16. In this manner, a print job can be sent from internet application 15 through CPSI client 16 and IPP client 17 to IPP server 19 within CHE 6 and on to CPSI server 37. CHE 6 also includes preferences directory 21 which stores information about the preferences and printing abilities of home users who subscribe to the associated digital cable network, such as digital cable network 105. Also included in CHE 6 is CPSI spooler 20 which receives print jobs from CPSI server 37, creates logical printers corresponding to one or more printer(s) of the appropriate home user, and which creates queues for each logical printer in which print jobs are spooled for subsequent transmission to the corresponding a targeted printer of a home user. Print jobs are de-spooled from CPSI spooler 20 by CPSI client 38 and then passed via IPP client 24 in CHE 6 to IPP server 25 which is contained within set-top box 10 of a home user. Also included in CHE 6 is CHE application 22 for providing particular services, such as cable digital network administrative information and set-up services, to set-top box 10 of a home user. This is achieved by sending a print job from CHE application 22 through CPSI client 23 (which is dedicated for use by CHE 6) and then on to IPP client 18. The print job is sent from IPP client 18 to IPP server 19, whereupon the previously described spooling, de-spooling and transmission to STB 10 take place.

Once a print job is received by IPP server 25 in set-top box 10, it is passed to CPSI server 39 and then to local CPSI spooler 26. CPSI spooler 26 contains a queue for each logical printer corresponding to each physical printer connected to set-top box 10, such as printer 12. Set-top box 10 also includes STP internet application 27 and CPSI client 29 for internally initiating transmission of a print job from set-top box 10 to printer 12. Printer driver 28 is also provided in set-top box 10 in order to rasterize an internally-generated print job within set-top box 10 for printing on printer 12. It should be noted that preferences directory 21 within CHE 6 also contains the necessary printer drivers for rasterizing print jobs received by CPSI spooler 20 for subsequent transmission to set-top box 10 and then direct printing on printer 12.

The Cable Printing Services Infrastructure (CPSI) architecture described above provides an efficient means to support push-printing of print jobs from internet applications, such as merchants, financial institutions and e-commerce web sites, to a home user's printer via the internet and the digital cable network to which the home user subscribes. For example, a bank which has internet connectivity via internet-based internet application 15 can transmit a print job consisting of print data representing a particular home user's banking statement to CHE 6 which then rasterizes the print job and forwards it to the home user's STB 10, which in turn submits it to printer 12 for printing. In this manner, the home user can directly receive a personalized monthly financial statement from the bank without the need for using the mail or other means of delivery. It can be appreciated that push-printing of print jobs is a valuable service for a myriad of other internet applications in which the home user has an interest.

In addition to directly targeted push-printing of a customized print job, such as the financial statement in the foregoing example, the CPSI architecture can also be utilized by internet applications, such as third-party merchants 102 and 103, to distribute a non-personalized print job to multiple home users. Such non-personalized print jobs may include coupons, promotional material, advertisements and the like. Such distributed push-printing is achieved by sending a particular print job, such as a coupon, from internet application 15 in application module 14 of an internet application to CHE 6 wherein the print job copied for each of the multiple home users to which the print job is addressed. Preferences directory 21 of CHE 6 is then accessed to obtain the preferences, and printing capabilities and printing parameters of each addressed home user. This information is then utilized to format a separate copy of the print job for each printer of each addressed home user, and each separate copy is then placed in the appropriate print queue for subsequent transmission to each respective printer.

Distributed push-printing in this manner allows internet applications, such as third-party merchants 102 and 103 to send coupons, advertisements and the like on a mass-distribution basis to home users via the internet and digital cable network 105, without the need for intervention on the part of the home user. Although such material may be of interest and value to the a receiving home user, it can be appreciated that the home user's printer may become inundated with a large amount of such third-party-initiated print jobs, much of which may not be of interest to the home user. As mentioned above, even if the home user has an interest in the print jobs which are push-printed directly to the home user's printer, the home user may not want to absorb the expense of the replacing the printer related consumables, such as ink and paper, which are expended during the printing of such materials.

The present invention provides a system and method for allowing a home user to regulate the type and amount of print jobs which are push-printed to the home user from third-party internet applications, such as third-party merchants 102 and 103. In addition, the present invention allows the home user to demand compensation for allowing such print jobs to be push-printed to the home user's printer, thereby offsetting the expenses related to the printer-related consumables which are expended during the printing.

Figure 3:
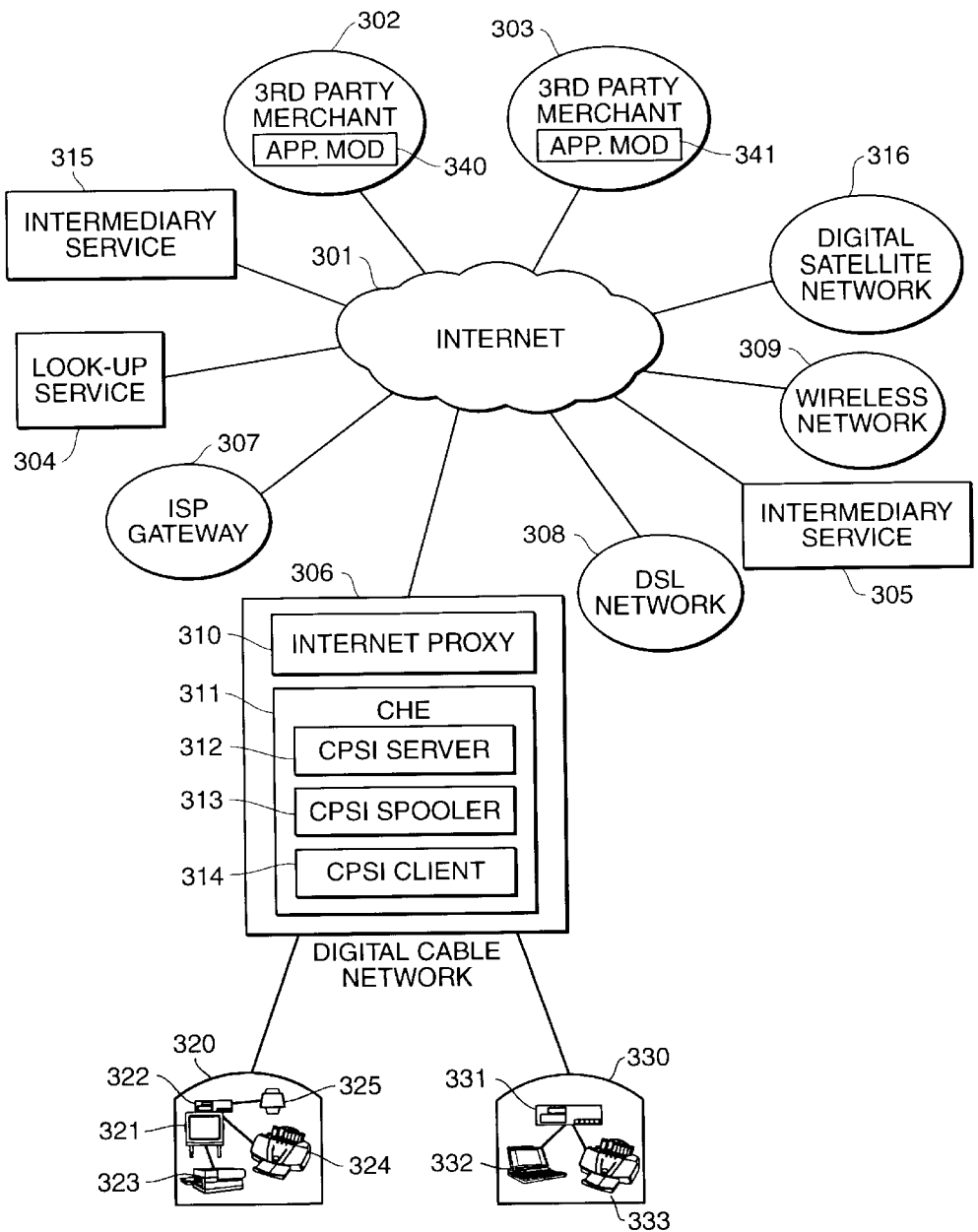
FIG. 3 is a diagram for explaining the networked environment for supporting push-printing according to one embodiment of the present invention.

FIG. 3 depicts an example of the present invention for providing authorization of third-party push-printing of a print job to the printer of a home user who has access to the internet via a digital cable network. With reference to FIG. 3, a networked environment similar to that of FIG. 1 is depicted in which multiple networks, such as ISP gateway 307, digital cable network 306, and DSL network 308, wireless network 309 and digital satellite network 316 are connected to internet 301. Third-party merchants 302 and 303 represent entities such as banks, e-commerce companies, utility companies and the like, and are connected to internet 301 by typical means. For instance, third-party merchant 302 may represent an internet server which is connected to the internet and which hosts a web site for presenting the services and/or products of the third-party merchant. As depicted in FIG. 3, third-party merchants 302 and 303 contain application modules 340 and 341, respectively, for supporting push-printing according to the CPSI architecture described above. As described in reference to FIG. 2, each of application modules 340 and 341 contain an internet application module, a CPSI client module and an IPP client module.

Digital cable network 306 contains cable head end (CHE) 311 which corresponds to CHE 6 of FIG. 2, and which similarly contains CPSI server 312, CPSI spooler 313 and CPSI client 314 for supporting the push-printing of print jobs to home users of digital cable network 306. Also included in digital cable network 306 is internet proxy 310 for connecting CHE 311 to internet 301, thereby providing substantially transparent internet access to a large number of home users who subscribe to digital cable network 306, such as home users 320 and 330.

Each of home users 320 and 330 have home access devices for connection to CHE 311 of digital cable network 306. For example, home user 320 has set-top box (STB) 322 for use in conjunction with television 321 to access internet 301 via digital cable network 306. In contrast, home user 330 has residential gateway 331 for connecting computing devices and peripherals, such as laptop computer 332 and ink-jet printer 333, to digital cable network 306. STB 322 of home user 320 is connected to printer 323, printer 324 and printer 325 in order to accommodate the various printing needs of home user 320 and/or others who reside with home user 320. For example, printer 323 is a conventional laser printer for use in formal and business related home applications, printer 324 is an ink-jet printer for family-related applications such as the printing of graphics and photographs, and printer 325 is a small coupon-sized printer for printing coupons and other similarly sized items. In this manner, for example, third-party merchant 302 can push-print a print job from application module 340 through internet 301 to CHE 311 of digital cable network 306 which then forwards the print job to STB 322 of home user 320 for printing on printer 324.

Also provided in FIG. 3 are look-up service 304 and intermediary services 305 and 315 for controlling access to the printers of home users so that only those print jobs that are authorized by the home users can be push-printed to their respective printers. Each of intermediary services 305 and 315 is a business or other entity which is trusted by a certain group of home users, such as home users 320 and 330, to control the authorization of internet applications, such as third-party merchants 302 and 303, to send print jobs to the printers of the group of home users. The intermediary services works in conjunction with one or more of the various networks, such as digital cable network 306, to control push-printing access to the printers of some or all of the home users on the respective network(s).

Specifically, intermediary services 305 and 315 are connected to internet 301 for access by internet applications to obtain authorization for pushing print jobs to a home user, and for communicating with the network of the home user to coordinate control of access to the home user's printer. In this manner, intermediary services 305 and 315 are able to completely prohibit the push-printing of print jobs to a home users' printer, to limit the push-printing of only those print jobs in which the home user has an interest, and to require compensation to the home user in return for authorizing the push-printing of a print job by a third-party internet application to the home user. Preferably, intermediary services 305 and 315 utilize secure connections over internet 301 so that negotiations for authorization to push a print job, instructions to allow the print job to reach the home user's printer, and payment collection and transfer to the home user are conducted in a secure manner. Intermediary services 305 and 315 therefore provide each home user with the ability to control which print jobs are allowed to be push-printed to the home user's printer, if any, and the ability to be compensated for those print jobs which the home user allows.

Although only two intermediary services are depicted in FIG. 3, it can be appreciated that a large number of intermediary services may be utilized to practice the present invention. For example, a large number of intermediary services may be utilized to control access to the printers of home users, wherein each intermediary service controls access for a group of home users within a given geographic region. In the alternative, each intermediary service may control access for some or all of the home users who subscribe to a particular network, such as digital cable network 306 or DSL network 308. In another alternative, each intermediary service may control access for some or all of the home users who subscribe to a particular network, such as digital cable network 306 or DSL network 308, and who reside within a particular geographic area. It can be appreciated that other factors may determine which home users are managed by which intermediary services, such as the personal choice of each home user to use a specific intermediary service.

Look-up service 304 provides a directory-based service for identifying which intermediate service manages and controls access of push-print jobs to the printer of a particular home user. Look-up service 304 is also preferably connected to internet 301 as depicted in FIG. 3 for quick and efficient access by third-party internet applications with push-print capabilities. For example, a third-party internet application, such as third-party merchant 302, needs to know which one of intermediary services 305 and 315 to contact in order to obtain authorization for pushing a print job to printer 324 of home user 320. Look-up service 304 preferably contains a global directory for identifying which intermediary service provides authorization for a given home user. It can be appreciated that look-up service 304 may utilize other means to identify the proper intermediary service for a given home user. For instance, look-up service 304 may comprise a search engine which quickly searches all intermediary services for a given home user. It can also be appreciated that look-up service 304 may not necessarily be connected to the internet and may instead be accessed by other means, such as by telephone, hard-copy, CD-ROM, floppy, etc.

The embodiment of the invention depicted in FIG. 3 therefore provides an efficient means for controlling access to the printer of a home user by a third-party internet application, and a mechanism for requiring compensation by the third-party internet application to the home user for authorization to push a print job to the home user's printer.

Figure 4:
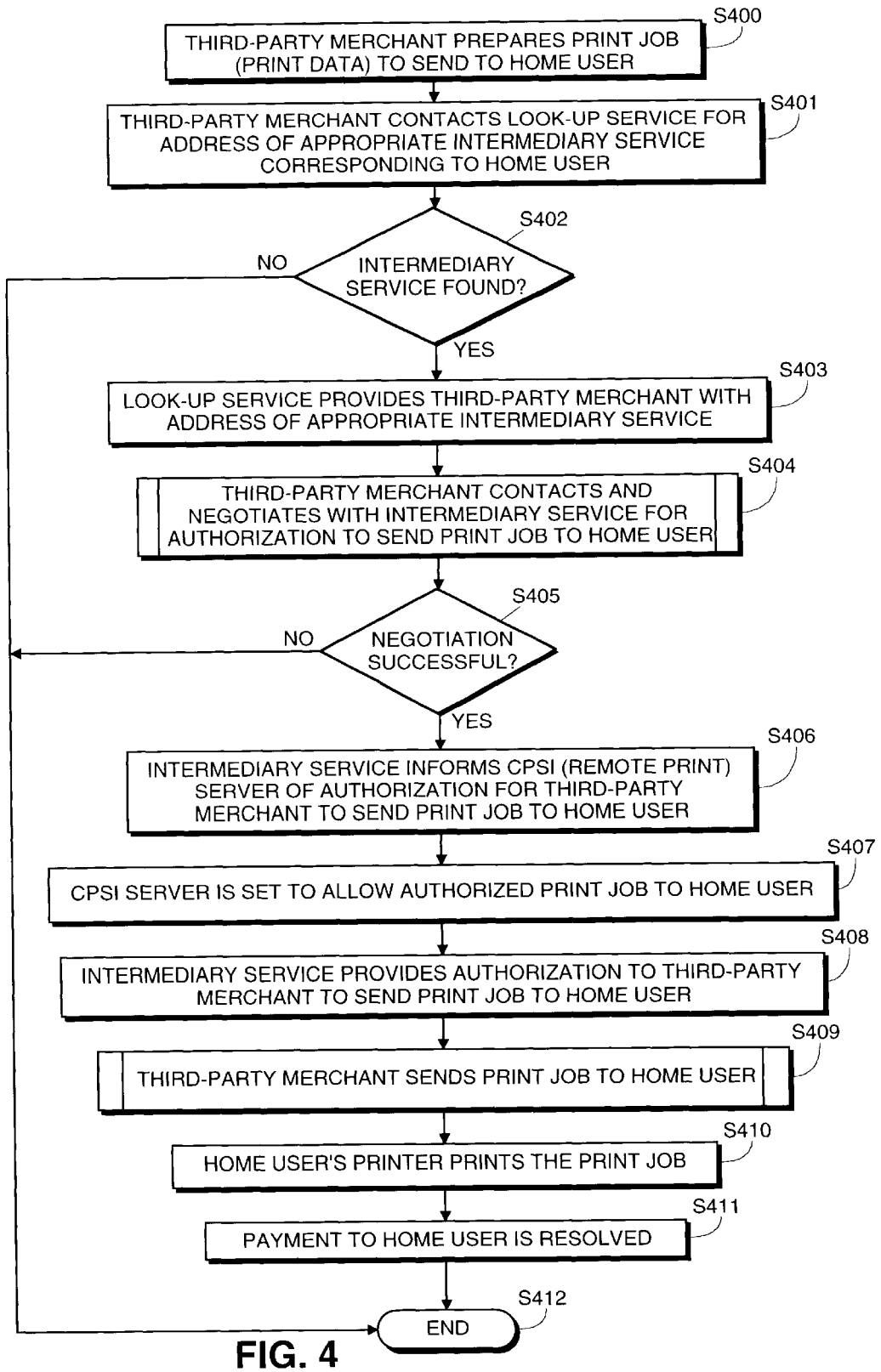
FIG. 4 is a flowchart for explaining push-printing according to one embodiment of the present invention.

FIG. 4 provides a flowchart for illustrating the manner in which the present invention is utilized. Specifically, in step S400, a third-party merchant, such as third-party merchant 302, prepares a print job, such as a coupon, to send to home user 320. Third-party merchant 302 has some form of identification information for home user 320, such as a name, telephone number, address or E-mail address. In step S401, third-party merchant 302 contacts look-up service 304 in order to obtain information regarding the appropriate one of intermediary services 305 or 315, if any, which can provide authorization for third-party merchant 302 to push the print job to home user 320. Third-party merchant 302 provides the identification information regarding home user 320 to look-up service 304 in a query to obtain the appropriate intermediary service.

If an intermediary service can be found which is authorized to control access for pushing print jobs to the printers of home user 320 (step S402), then process flow passes to step S403 in which look-up service 304 provides third-party merchant 302 with identification information regarding the appropriate intermediary service, which is intermediary service 305 in this example. Preferably, the identification information provided by look-up service 304 regarding the appropriate intermediary service consists of an internet address (URL), although other information for identifying the appropriate intermediary service can be utilized, such as a name, or a code. If, on the other hand, an intermediary service can not be found which is authorized to control access for pushing print jobs to the printers of home user 320 (step S402), then process flow passes to end (step S412) and the process ends, in which case the requested print job is denied.

If look-up service 304 provides third-party merchant 302 with identification information, such as a URL, regarding intermediary service 305 (step S403), then flow passes to step S404 in which third-party merchant 302 contacts intermediary service 305 by using the URL. Third-party merchant 302 then proceeds to negotiate with intermediary services 305 in order to obtain authorization for pushing the print job to home user 320. These negotiations involve determining: whether home user 320 allows such print jobs to be sent to a printer of home user 320; the type of printer and print options to be used for printing the print job; the network location of home user 320; whether a price can be agreed upon, if required, for allowing the print job to be sent; and whether acceptable payment can be tendered. These negotiations are discussed in greater detail below with respect to FIG. 5.

If third-party merchant 302 successfully negotiates with intermediary service 305 for authorization to push the print job to home user 320 (step S405), then flow passes to step S406 in which intermediary service 305 contacts CHE 311 of digital cable network 306 and instructs CPSI server 312 to accept the print job when it is subsequently sent to CHE 311 for being forwarded over digital cable network 306 to home user 320. It should be noted that successful negotiation does not necessarily result in the immediate provision of authorization from intermediary service 305 to third-party merchant 302. This provision of authorization preferably does not occur until after CPSI server 312 is set, in response to the aforementioned instructions (step S407), to accept the print job when it is sent by third-party merchant 302 to CPSI server 312. Preferably, CPSI server 312 controls access to printers of home users by accepting a print job addressed to a home user only if the print job is specifically allowed according to the preferences of the home user which are stored in preferences directory 21, or if CPSI server 312 has been instructed by an authenticated intermediary service to accept the print job. In the latter case, CPSI server 312 preferably allows acceptance of the authorized print job for only a limited amount of time from the receipt of the authenticated intermediary service's instructions, after which the print job will not be accepted by CPSI server 312. If third-party merchant 302 does not successfully negotiate with intermediary service 305 for authorization to push the print job to home user 320 (step S405), then flow passes to end (step S412) and the process is terminated.

CPSI server 312 therefore acts as a filter to prohibit third-party internet applications, such as third-party merchant 302, from sending unauthorized and unwanted print jobs to the printer of home users. The filtering performed by CPSI server 312 is controlled by the preferences of home user 320 which are stored in preferences directory 21, such as preferences to allow frequent print jobs from third-party internet applications such as a bank or utility company used by home user 320, and is also controlled by instructions from intermediary services such as intermediary service 305 to allow authorized print jobs from third-party internet applications upon request from the third-party internet applications.

Next, intermediary service 305 contacts third-party merchant 302, preferably via internet 301, and provides third-party merchant 302 with authorization (step S408) to send the print job to CHE 311 which was identified by intermediary service 305 during negotiations as the appropriate location to send a print job addressed to home user 320. Preferably, this authorization is in the form of a token which is customized to reflect the specific print job request and which is only valid for a limited time. Third-party merchant 302 then sends the print job to CHE 311 via internet 301 (step S409) where CPSI server 312 accepts the print job as previously instructed by intermediary 305. The aforementioned token is preferably sent along with the print job by third-party merchant 302 to CPSI server 312, whereupon the token is inspected by CPSI server 312 and, if found to be authentic, is used by CPSI server 312 in conjunction with the previously received instructions to determine whether to accept the print job for home user 320. CHE 311 then processes, spools and de-spools the print job, and sends the print job to STB 322 of home user 320.

In an alternative embodiment of the invention, third-party merchant 302 sends the print job to intermediary service 305 via internet 301 after obtaining authorization, and intermediary service 305 then forwards the print job to CHE 311 via internet 301, after which CHE 311 processes, spools, de-spools and sends the print job to STB 322 of home user 320. These alternative methods for sending the print job from third-party merchant 302 to STB 322 of home user 320 are discussed in more detail below with respect to FIGS. 6A and 6B.

STB 322 forwards the received print job, which has preferably been rasterized by CHE 311, to printer 324 for printing according to the printer and printer options selected by third-party merchant 302 during the negotiations between intermediary service 305 and third-party merchant 302 (step S410). Preferably, CPSI server 312 sends a confirmation to third-party merchant 302 that the print job was transmitted to STB 322 of home user 320. The payment which was tendered by third-party merchant 302 to intermediary service 305 during negotiations is then resolved with home user 320, thereby compensating home user 320 for the printer-related consumables, such as ink and paper, which are utilized by printer 324 during printing of the print job. It can be appreciated that the resolution of the payment with home user 320 can be accomplished in a variety of ways. For example, the payment may be added as a credit to home user 320's digital cable network subscription account. In another embodiment, the payment may be credited to the home user in the form of "internet money" which is commonly referred to as "beans". The payment may instead be provided to home user 320 in the form of vouchers and/or coupons for purchasing printer-related consumables such as ink and paper. Lastly, the payment may be provided to home user 320 directly in the form of a check from intermediary service 305 or in the form of a credit on a credit card account of home user 320. Of course, other methods of payment are applicable to the present invention.

Figure 5:
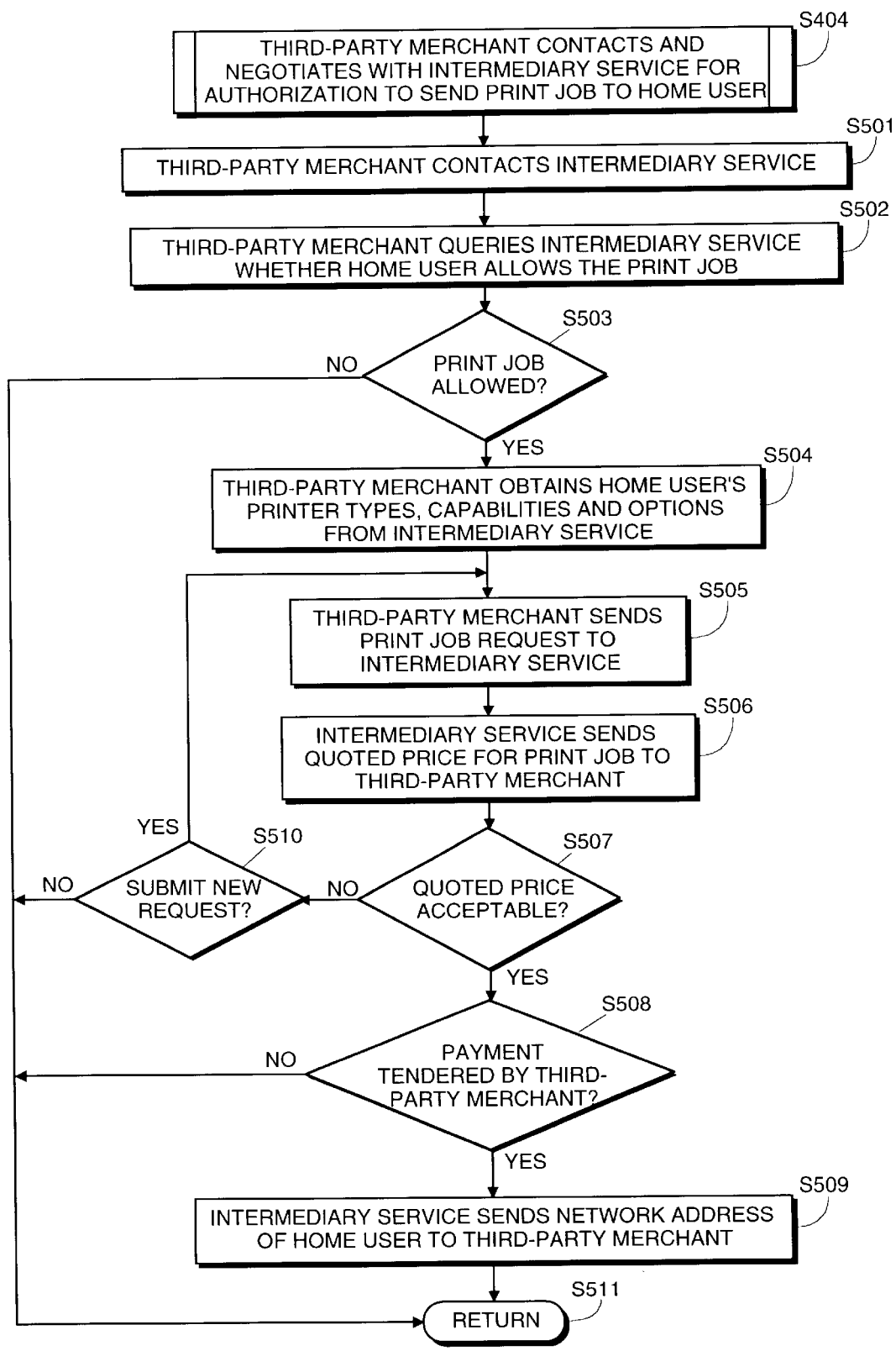
FIG. 5 is a flowchart for further explaining the negotiating step of the flowchart depicted in FIG. 4.

FIG. 5 is a flowchart further explaining step S404 of FIG. 4 in which third-party merchant 302 contacts and negotiates with intermediary service S305 to obtain authorization for sending the print job to home user 320. Specifically, third-party merchant 302 contacts intermediary service S305 in step S501 by using the identification information, such as a URL, provided by look-up service 304. Third-party merchant then queries intermediary service 305 to determine whether home user 320 allows the print job to be sent to a printer of home user 320 (step S502). Intermediary services 305 makes this determination by checking information which was previously provided by home user 320 regarding the types of third-party internet applications that home user 320 will allow to send print jobs, if any, and regarding the compensation required by home user 320 for allowing such print jobs to be sent. Preferably, this information is provided by home user 320 when home user 320 first subscribes to digital cable network 306 and is stored in preferences directory 21 of CHE 311, in which case intermediary service 305 contacts CPSI server 312 by internet 301 to obtain the information. In the alternative, the information may be provided when home user 320 first subscribes to intermediary service 305 for controlling push-printing to the printers of home user 320, in which case the information is stored locally in a storage means by intermediary services 305. The manner in which such information is initially provided by home user 320 is discussed in more detail below with respect to FIG. 8.

If home user 320 allows the print job to be sent to a printer of home user 320 (step S503), then flow passes to step S504 in which intermediary service 305 provides information regarding the types of printers which are made available by home user 320 for printing print jobs, and the corresponding printing options and capabilities of the available printers. This printer-related information is also preferably provided by home user 320 according to one of the aforementioned subscription methods, and as described in more detail below with respect to FIG. 8. For example, home user 320 has laser printer 323, ink-jet printer 324 and coupon printer 325, each of which supports various print options such as print speed, resolution (dpi), color or black/white modes, paper types and quality, and post-printing (collate/staple), for example. These options are obtained by third-party merchant 302 which then decides which printer and which print options are appropriate for the print job. If home user 320 does not allow the print job to be sent to a printer of home user 320 (step S503), then flow passes to return (step S511).

In step S505, third-party merchant 302 submits a print job request to intermediary service 305 which requests a print job of a specified number of pages for printing on a selected printer of home user 320, such as printer 324, with certain selected options such as 360 dpi, and color mode on plain paper. Intermediary service 305 then returns a quoted price to third-party merchant 302 for the print job based upon the number of pages, type of paper, and other print job request parameters (step S506). If third-party merchant 302 accepts the quoted price for the print job request (step S507), then third-party merchant 302 tenders the appropriate payment to intermediary service 305 in step S508. It can be appreciated that several different means can be utilized to tender the payment. For instance, third-party merchant may have a pre-existing account with intermediary service 305, whereupon the account is simply debited the amount of the payment. Instead, the payment could be directly billed by intermediary service 305 to third-party merchant 302. In another example, third-party merchant 302 may present credit card information to intermediary service 305 which is then verified and charged according to commonly known internet credit card techniques and services.

If third-party merchant 302 does not accept the quoted price for the print job request (step S507), then third-party merchant 302 determines whether to submit another print job request to intermediary services 305 based on a different print job or on different print options such as number of pages, type of paper, etc. (step S510). If third-party merchant 302 determines not to submit another print job request to intermediary services 305, then flow passes to return (step S511). If, on the other hand, third-party merchant 302 determines to submit another print job request to intermediary services 305, then flow passes to step S505 and steps S505 to S507 are repeated based on a new print job request.

If tender of payment is successfully negotiated in step S508, flow passes to step S509 in which intermediary services 305 sends information to third-party merchant 302 regarding the network location of home user 320, and regarding the home user's corresponding network gateway, which in this example is CHE 311 of digital cable network 306. This information is subsequently used to push the print job forward to CPSI server 312 of CHE 311 for ultimate receipt by STB 322 of home user 320. Flow then passes to return (step S511). If, however, tender of payment is not successfully negotiated in step S508, then flow passes directly to return (step S511) and the negotiation process is aborted.

Figure 6A:
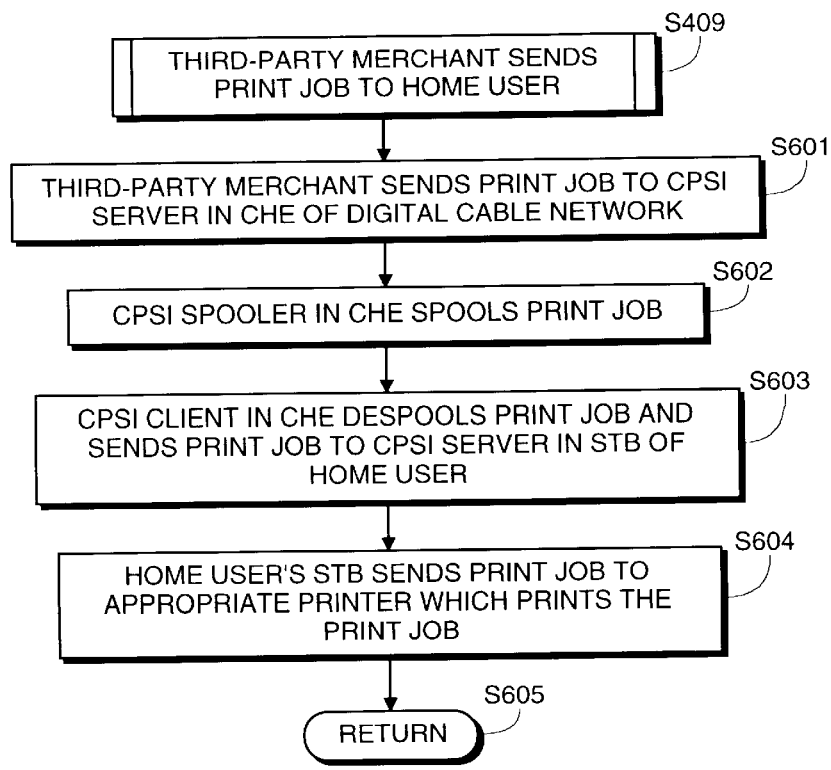
FIG. 6A is a flowchart for explaining one embodiment of the printing step of the flowchart depicted in FIG. 4.

FIG. 6A is a flowchart for explaining step S409 of FIG. 4 according to one embodiment of the invention in which a print job is sent from third-party merchant 302 directly to CPSI server 312 of CHE 311 for delivery to home user 320. Specifically, third-party merchant 302 sends the print job to CHE 311 via internet 301, preferably in a secured fashion, whereupon CPSI server 312 accepts the print job as previously instructed by intermediary 305 (step S601). The aforementioned token which was sent to third-party merchant 302 by intermediary service 305 is preferably sent along with the print job by third-party merchant 302 to CPSI server 312 and, if found to be authentic, is used by CPSI server 312 in conjunction with the previously received instructions to determine whether to accept the print job. Next, CHE 311 spools the print job in step S602 by using CPSI spooler 313 which first rasterizes the print job with a printer driver that corresponds to the printer selected during negotiations, in this case printer 324.

Preferably, the appropriate printer driver is stored in preferences directory 21 of CHE 311 for access by CPSI spooler 313. In the alternative, the appropriate printer driver can be obtained from an external memory source such as a floppy, CD-ROM, network server, or the internet. CPSI spooler 313 then spools the rasterized print job in a queue of a logical printer corresponding to printer 324 (step S602). The print job is then de-spooled in sequential order by CPSI client 314 of CHE 311 and sent to STB 322 of home user 320 (step S603). STB 322 then forwards the print job to printer 324 where it is printed according to the print options selected by third-party merchant 302 (step S604). Preferably, STB 322 has the capability to retain the print job in the local spooler of STB 322, (CPSI spooler 26, FIG. 2), whereupon the home user can subsequently view the print job and/or send the print job to printer 324 for printing. This capability gives the home user the ability to pre-filter the received print jobs before deciding to print them.

Figure 6B:
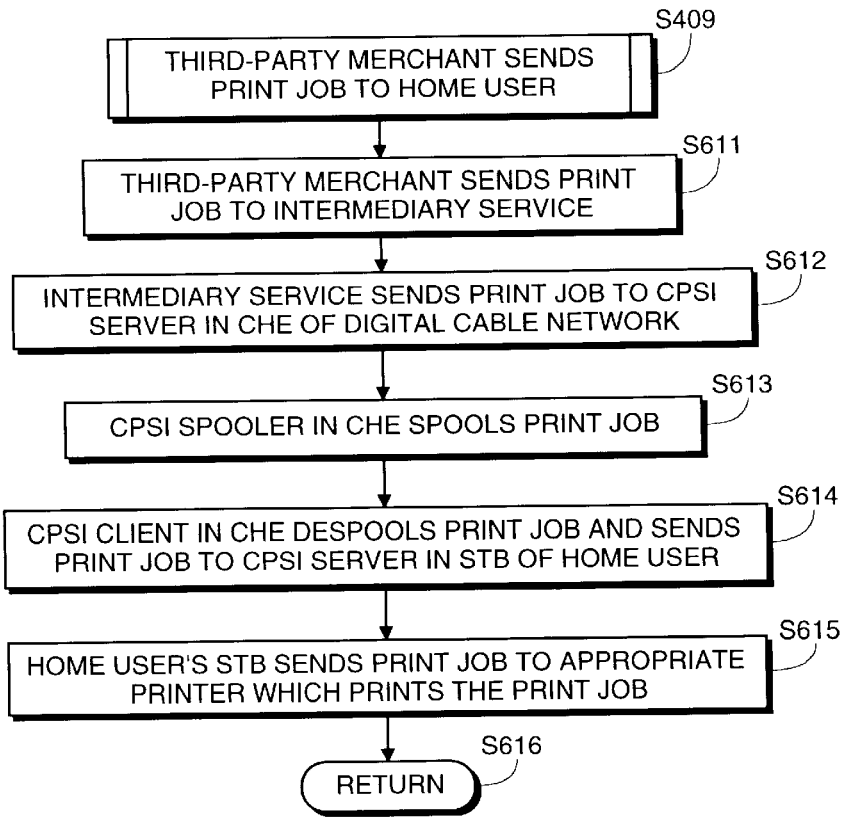
FIG. 6B is a flowchart for explaining another embodiment of the printing step of the flowchart depicted in FIG. 4.

FIG. 6B is a flowchart for explaining step S409 of FIG. 4 according to another embodiment of the invention in which third-party merchant 302 sends a print job first to intermediary service 305 via internet 301 after obtaining authorization, and intermediary service 305 then forwards the print job to CHE 311 via internet 301 for delivery to home user 320. Specifically, third-party merchant 302 sends the print job to intermediary service 305 via internet 301 in step S611, preferably in a secure fashion, after obtaining authorization. Intermediary service 305 then sends the print job to CHE 311 via internet 301, preferably in a secure fashion, whereupon CPSI server 312 accepts the print job as previously instructed by intermediary 305 (step S612). The aforementioned token which was sent to third-party merchant 302 by intermediary service 305 is preferably sent along with the print job to CPSI server 312 and, if found to be authentic, is used by CPSI server 312 in conjunction with the previously received instructions to determine whether to accept the print job.

Next, CHE 311 spools the print job in step S613 by using CPSI spooler 313 which first rasterizes the print job with a printer driver that corresponds to the printer selected during negotiations, in this case printer 324. The printer driver is obtained as described above with respect to the embodiment illustrated in FIG. 6A. CPSI spooler 313 spools the rasterized print job in a queue of a logical printer corresponding to printer 324 (step S613). The print job is then de-spooled in sequential order by CPSI client 314 of CHE 311 and sent to STB 322 of home user 320 (step S614). STB then forwards the print job to printer 324 where it is printed according to the print options selected by third-party merchant 302 (step S615). Preferably, STB 322 has the capability to retain the print job in the local spooler of STB 322, (CPSI spooler 26, FIG. 2), whereupon the home user can subsequently view the print job and/or send the print job to printer 324 for printing. This capability gives the home user the ability to pre-filter the received print jobs before deciding to print them. The embodiment depicted in FIG. 6B has the advantage of treating intermediary service 305 as a one-stop shop for third-party merchant 302 wherein intermediary service 305 negotiates the authorization and payment for the print job, and then accepts the print job directly from third-party merchant 302 for ultimate receipt by home user 320.

Figure 7:
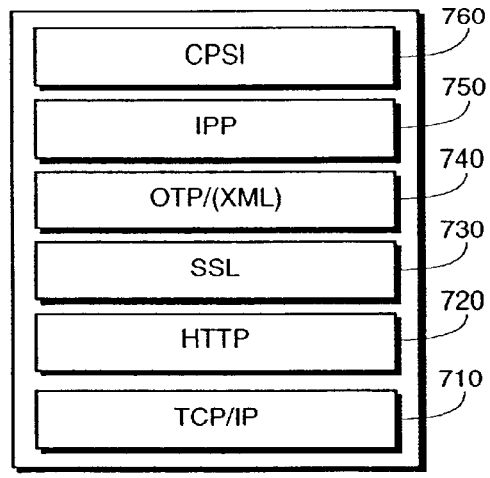
FIG. 7 is a diagram for explaining a protocol stack according to one embodiment of the present invention.

FIG. 7 illustrates the various types of protocols that are utilized to practice the invention according to the embodiment described in FIGS. 3 through 6. Specifically, FIG. 7 shows a hierarchical layering of six protocols arranged in a protocol stack. The protocol stack depicted in FIG. 7 is preferably used to support all communications between a third-party internet application, such as third-party merchant 302, and intermediary service 305. In addition, the protocol stack is preferably used to support all communications between a third-party internet application, such as third-party merchant 302, and a network hub or gateway, such as digital cable network 306. Lastly, the protocol stack is preferably used to support communications between an intermediary service, such as intermediary service 305, and a network hub or gateway, such as digital cable network 306. In this manner, the protocol stack supports the communications and negotiations described above for obtaining authorization from an intermediary service for pushing a print job from a third-party internet application to a home user's printer, and for tendering and resolving payment by the third-party internet application for such authorization.

Returning to FIG. 7, it can be seen that the lowest-level protocol is TCP/IP 710, which is a widely used network communications protocol. The next protocol in the protocol stack is HTTP 720, which is a widely used communications protocol for use on the internet. In this manner, for example, third-party merchant 302 can communicate via internet 301 with intermediary service 305 to negotiate and obtain authorization for sending a print job to home user 320. The aforementioned protocols also support communication between intermediary service 305 and CHE 311 via internet 301, thereby enabling intermediary service 305 and CHE 311 to coordinate and control access to the printers of home users 320 and 330. Lastly, the aforementioned protocols support communication between third-party merchant 302 and CHE 311 via internet 301 to allow the print job to be pushed from third-party merchant 302 through CHE 311 to home user 320 for printing on printer 324.

As mentioned above, it is preferred that the communications between third-party merchant 302, intermediary service 305 and CHE 311 are conducted in a secure manner. To provide for such security, SSL protocol 730 is provided in the protocol stack to establish secure connections between the aforementioned entities during the communications, negotiations and transfer of print data. SSL is a commonly used secure protocol for use in network environments and, specifically, on the internet. Although the foregoing communications and negotiations can be performed using TCP/IP 710 and HTTP 720, it is preferable to use a more efficient protocol in addition to the aforementioned protocols to provide for consistent, efficient and quick negotiations for obtaining authorization to send a print job to a home user, and to pay for such authorization. In this regard, the next protocol layer in the protocol stack contains at least OTP 740 (open trading protocol), and may also contain a customized protocol supported by XML. OTP 740 is a protocol for use in conducting business between two entities via a network, such as conducting e-commerce on the internet. OTP 740 provides a quick, consistent and efficient negotiation and purchase protocol. OTP 740 is not, however, tailored to the specific negotiations utilized in support of the present invention for obtaining authorization to push-print a print job to a home user. It can be appreciated that a customized protocol, such as one based on XML (extensible markup language), could be used to support the particular negotiations for authorization and payment described above with respect to the present invention.

The top two protocol layers of the protocol stack support the transfer of print data from a third-party internet application, such as third-party merchant 302, to a home user, such as home user 320. In particular, IPP 750 (internet printing protocol) is provided for assisting in the transfer of print data via internet 301, whether between third-party merchant 302 and intermediary service 305, third-party merchant 302 and CHE 311, or intermediary service 305 and CHE 311. IPP 750 is a protocol for supporting control and transfer of print data over the internet. Lastly, CPSI 760 is a specialized protocol for establishing and controlling communications between CPSI servers, such as CPSI server 312 of CHE 6, and CPSI clients, such as CPSI client 16 of application module 340 in third-party merchant 302. In this manner, the architecture which is described in the aforementioned U.S. patent applications, which are incorporated by reference herein, is supported for enabling push-printing of a print job from a third-party internet application to a home user. In this regard, U.S. patent application Ser. No. 09/357,593, "Secure Printing Over a Cable Network To a Home Printer", describes an architecture for supporting push-printing of a print job in a secure fashion from a third-party internet application to the home user via a digital cable network.

Figure 8:
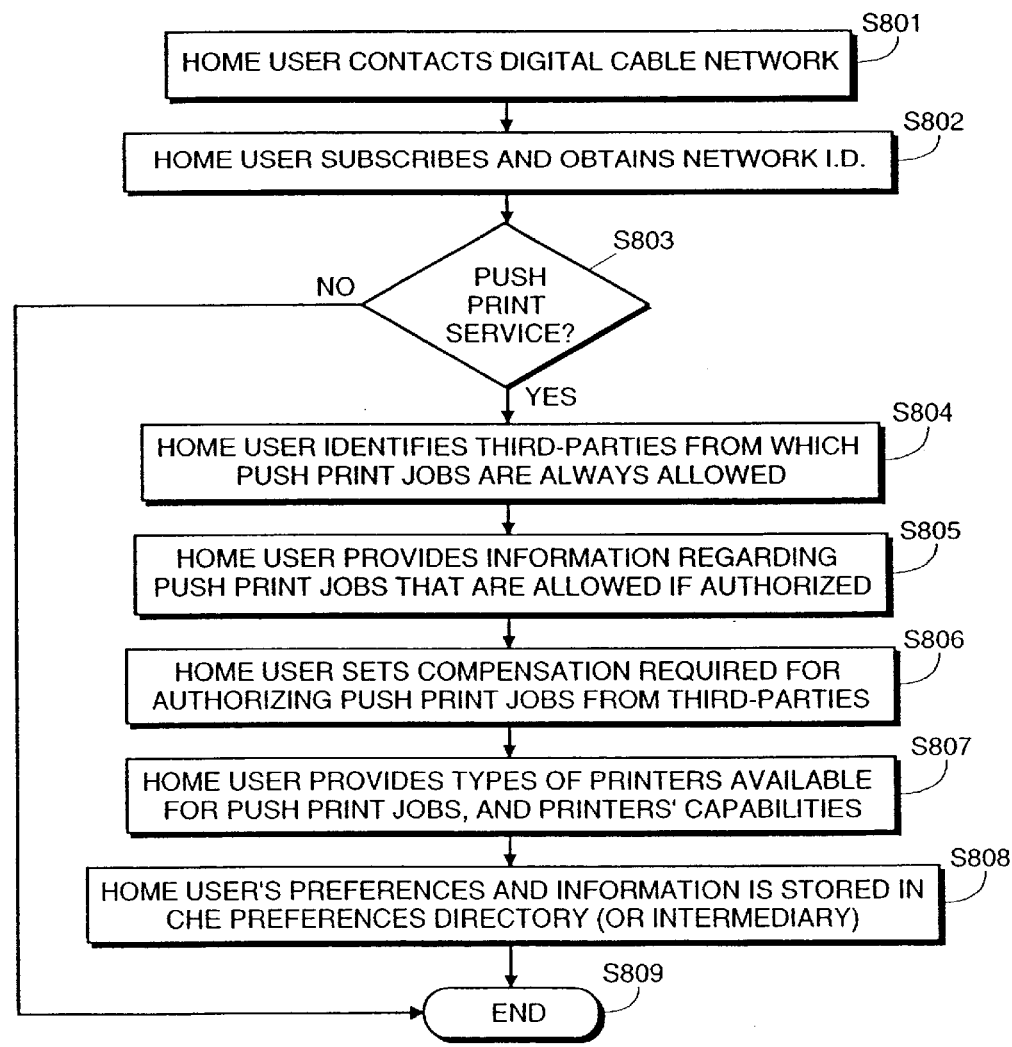
FIG. 8 is a flowchart for explaining set-up of push-print information according to one embodiment of the present invention.

FIG. 8 is a flow chart for describing how a home user provides appropriate print-related information for subsequent use by an intermediary service in negotiating with a third-party internet application for authorization to send a print job to a printer of the home user. As described above, this information can be stored either in preferences directory 21 of CHE 311, or can be stored in the intermediary service which controls and manages authorization for access to the printers of the home user. Turning to FIG. 8, the home user interested in subscribing to a particular network, such as home user 320 on digital cable network 306, contacts the network in step S801. Once contact has been established, the home user subscribes to the network and preferably obtains a network identification of some form, preferably a network address (step S802). Next, in step S803, it is determined whether the home user agrees to allow the use of push-print service such that third-party internet applications can push-print jobs to a printer of the home user. If the home user does agree to use push-print service, flow passes to step S804. If the user does not agree to use push-print service, then flow passes to end (step S809).

In step S804, the home user provides preferences regarding the push-print service by identifying the third parties from which push-print jobs will always be allowed by the home user for printing on a printer of the home user. In this manner, the home user can identify certain third parties which can always send print jobs for printing on a printer of the home user without the need for prior authorization by an intermediary service. In such cases, CPSI server 312 would simply accept the allowed print jobs based on the aforementioned preferences and would pass the print jobs to the home user for printing. For example, a home user who subscribes to internet banking services of the home user's bank would identify the bank internet services as a third party which is always allowed to send push-print jobs directly to the printer of the home user, wherein the print jobs consist of monthly financial banking statements. It can be appreciated that many different types and forms of third parties can provide useful and beneficial information to the home user in this manner on a frequent basis.

Next, the home user provides information regarding the types of third parties from which push-print jobs will be allowed upon prior authorization from an intermediary service (step S805). For example, the home user may have an interest in baseball, and therefore indicates that print jobs from baseball-related third-party internet applications are acceptable if prior authorization is obtained from an appropriate intermediary. In this manner, the home user can effectively filter push-print job requests from third parties so as to only receive those print jobs in which the home user may have an interest and which have been previously authorized by an appropriate intermediary. In step S806, the home user sets the amount of compensation and associated conditions which the home user requires for providing authorization to a third party for pushing a print job to a printer of the home user. For example, the home user may set a flat amount of ten cents per page printed, or may provide an elaborate compensation structure based on the type of paper used, the color mode, and other options which are used during printing of a specific print job. Next, the home user provides information regarding the types of printers which are made available by the home user for printing push-print jobs on the home user's printer (step S807). In addition, the home user provides printer capabilities and/or printing options such as the type of paper that the home user keeps in each home printer, color modes and resolution. Preferably, many of the capabilities and options corresponding to each printer are obtained by accessing the printer driver which corresponds to each printer.

The aforementioned information and preferences provided by the home user are then collected and stored by the network which the home user subscribes to (step S808). Specifically, the aforementioned information is preferably stored in the preferences directory of the cable head end. As discussed above, the aforementioned information may alternatively be stored at the appropriate intermediary services which controls and manages authorization for pushing print jobs to a printer of the home user (step S808). In this manner, information regarding the home user's preferences and printer capabilities is obtained at the time the home user subscribes to a particular network, such as digital cable network 306. As discussed above, an alternative embodiment of the present invention can be practiced wherein a home user who has already subscribed to a particular network, such as digital cable network 306, can choose a particular intermediary service that the home user wishes to use for controlling access to the printers of the home user.

In this alternative embodiment, the home user contacts and subscribes to the particular intermediary service, instead of the network to which the home is already subscribed, and then proceeds to provide the aforementioned information in steps S803 to S808. It can also be appreciated that steps S801 through S808 may be performed by various means. For example, a home user may perform steps S801 through S808 by contacting the network of interest, such as digital cable network 306, by telephone and then providing all of the aforementioned information by telephone. In the alternative, the home user may conduct steps S801 through S808 by contacting the network of interest, such as digital cable network 306, through the network itself by using an appropriate access device, such as set-top box 322. In another alternative, the home user may contact an internet site or a web site on the world wide web which is maintained to support the network of interest, in order to conduct steps S801 through S808.

In yet another alternative, the home user simply agrees to a pre-determined set of preference conditions which includes the type of print jobs allowed by the home user, the compensation rates required for such print jobs, and information regarding the home user's printer. In this embodiment, the home user agrees to the pre-determined set of preference conditions when the home user first contacts an operator to activate the push-print service. For example, a home user may lease a printer from an operator, in which case the operator is already fully aware of the printer characteristics and capabilities, thereby enabling the operator to provide a full set of predetermined conditions, including a standard set of compensation rates.

Figure 9:
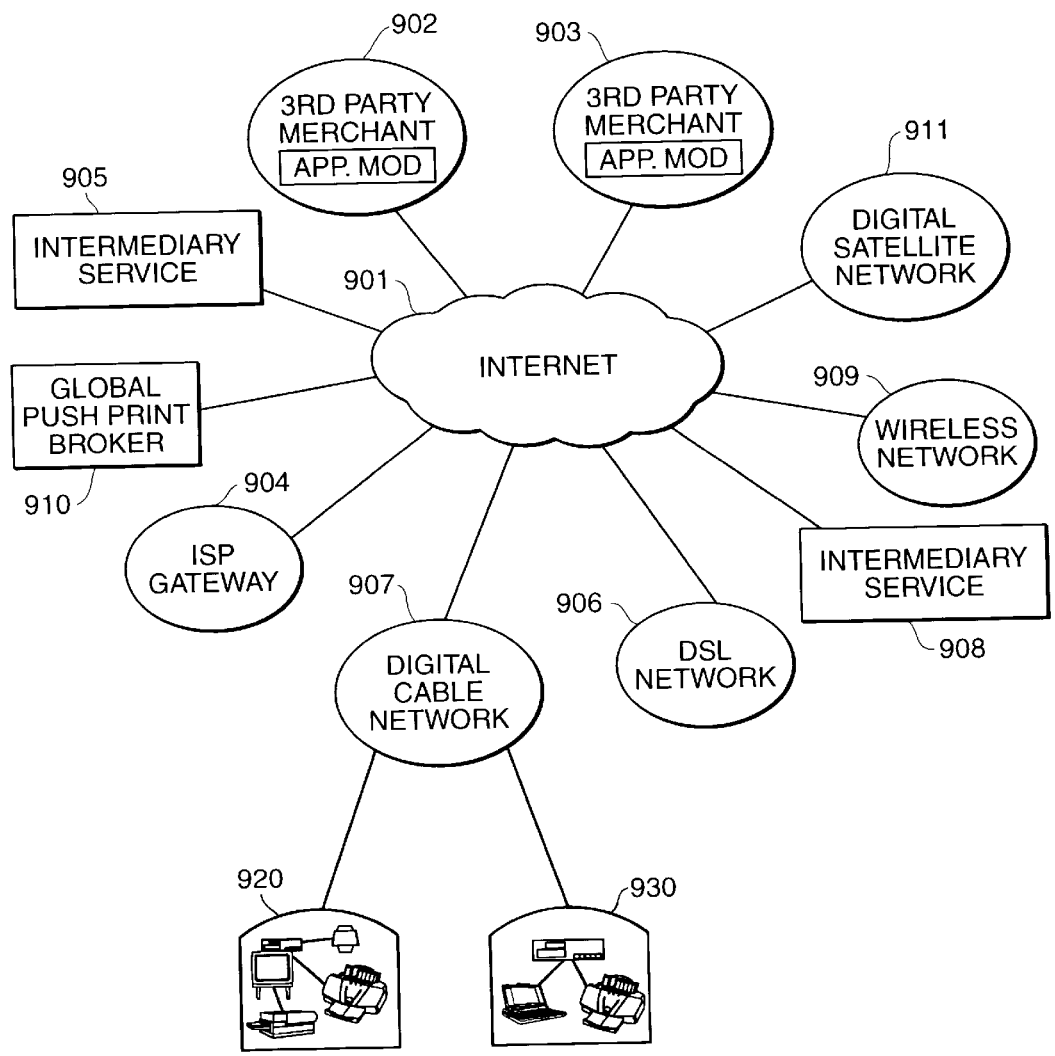
FIG. 9 is a diagram for explaining a networked environment utilizing a global push-print broker according to one embodiment of the present invention.

FIG. 9 provides an illustration of an embodiment of the present invention in which a global push-print broker is utilized instead of a look-up service. In particular, a network environment similar to that of FIG. 3 is depicted in FIG. 9, with the exception that look-up service 304 is not provided. Instead, global push-print broker 910 is provided in the place of such a look-up service. As with FIG. 3, internet 901 is provided, along with third-party merchants 902 and 903 and multiple networks, such as ISP gateway 904, DSL network 906, digital cable network 907, wireless network 909 and digital satellite network 911. In addition, intermediary services 905 and 908 are provided. The present invention according to this embodiment operates in substantially the same manner as described above with the exception that a third-party internet application, such as third-party merchant 902, contacts global push-print broker 910 instead of contacting a look-up service. Global push-print broker 910 acts as a one-stop shop for providing push-print services to third-party merchant 902 via internet 901.

In particular, global push-print broker 910 performs a look-up service similar to look-up service 304, and thereby identifies the appropriate intermediary service, such as intermediary service 905, for obtaining authorization to allow third-party merchant 902 to send a print job to a particular home user, such as home user 920 of digital cable network 907. In addition to acting as a look-up service, global push-print broker 910 handles the negotiations with the appropriate intermediary service to obtain authorization for pushing the print job to the appropriate home user. For example, once global push-print broker 910 determines that intermediary service 905 controls authorization for sending a print job to home user 920, global push-print broker 910 contacts intermediary service 905 via internet 901 to negotiate between intermediary service 905 and third-party merchant 902 to obtain authorization in the same manner described above with respect to FIGS. 4 and 5.

Lastly, global push-print broker 910 also handles the forwarding of the print job from third-party merchant 902 to the appropriate network, such as digital cable network 907, for ultimately being printed on a printer of home user 920. In particular, once global push-print broker 910 has identified the appropriate intermediary service and has negotiated successfully to obtain authorization for third-party merchant 902 to send the print job to home user 920, third-party merchant 902 then sends the print job directly to global push-print broker 910 via internet 901. Global push-print broker 910 then sends the print job to the appropriate network corresponding to the given home user to which the print job is addressed. For example, third-party merchant 902 sends the print job to global push-print broker 910 via internet 901, and then global push-print broker 910 sends the print job to the cable head end of digital cable network 907, which then sends passes the print job forward to home user 920 for printing on the printer of home user 920. In this manner, global push-print broker 910 becomes an efficient one-stop shop for providing push-print services to third-party is internet applications, such as third-party merchants 902 and 903.

It can be appreciated that the particular embodiments described above for providing an architecture to support push-printing in a digital 20 cable network can be generalized for use in other types of networks. Such a generalized infrastructure can be termed a home printing services infrastructure (HPSI), which is substantially similar to the CPSI architecture 25 described above. In this manner, push-printing of a print job by a third-party internet application can be supported by a variety of different networks, and the present invention for controlling access to the printer of a home user can also be supported in the variety of different networks.

Figure 10:
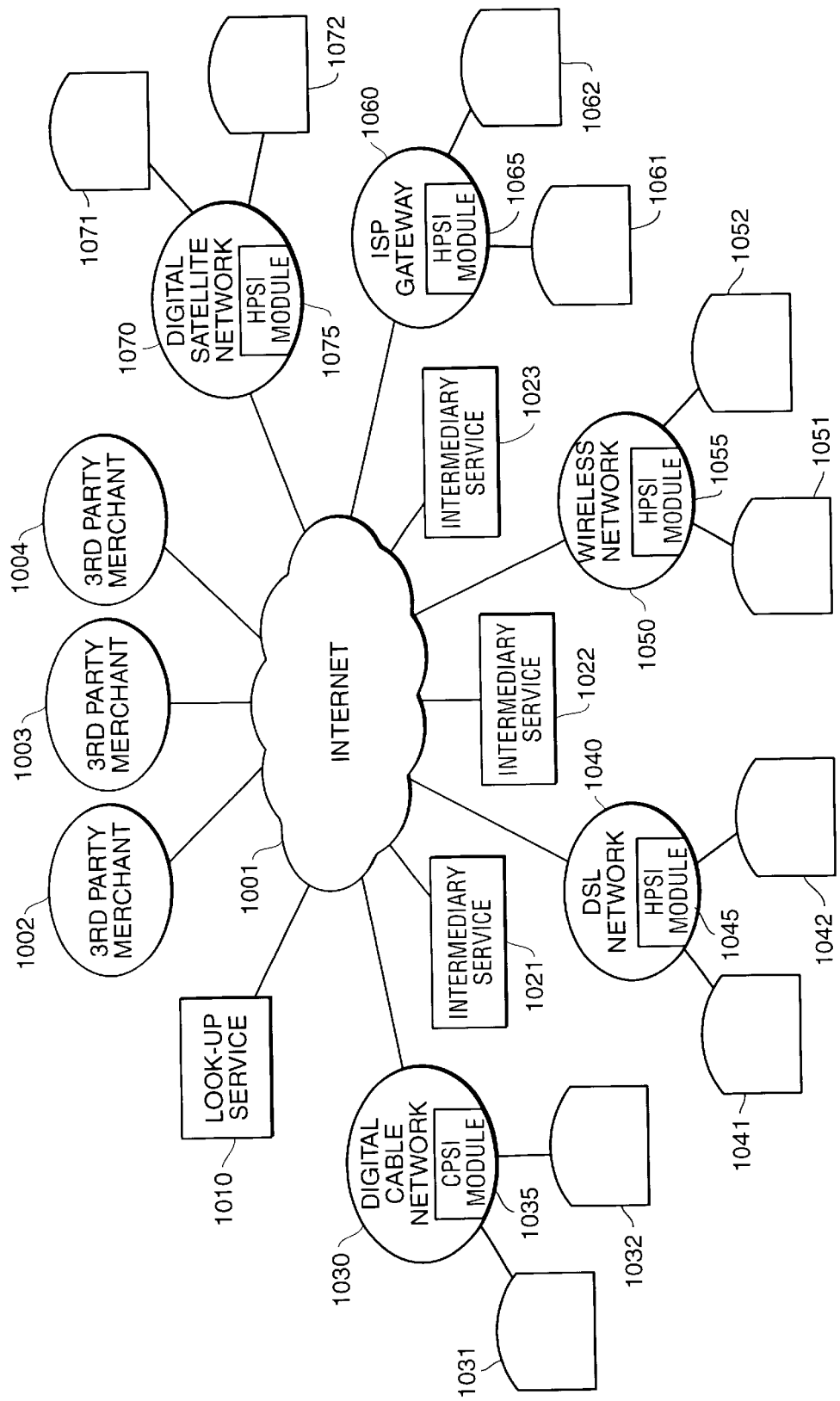
FIG. 10 is a diagram for explaining a networked environment for supporting push-printing in multiple networks according to one embodiment of the present invention.

FIG. 10 illustrates an embodiment of the invention in which the aforementioned CPSI architecture is generalized to be an HPSI architecture which is substantially similar in all respects to the CPSI architecture described with respect to FIG. 2, except for the nature of the communications network on which the architecture is hosted. In addition to digital cable network 1030, the architecture can also be hosted in a similar manner on DSL network 1040, wireless network 1050, ISP gateway 1060, and digital satellite network 1070. Therefore, it can be appreciated that a module similar to the cable head end of digital cable network 1030 can be provided for the HPSI architecture which similarly includes HPSI servers and clients, as well as an HPSI spooler for spooling print jobs in queues of logical printers corresponding to the printers of home users on the particular network.

With reference to FIG. 10, internet 1001 is provided, along with third-party merchants 1002 through 1004. In addition, look-up service 1040 is provided along with intermediary services 1021 to 1023. The aforementioned entities perform in the same manner described above. In addition, multiple networks are provided, including digital cable network 1030, DSL network 1040, wireless network 1050, ISP gateway 1060 and digital satellite network 1070. Each of the networks depicted in FIG. 10 contains an appropriate printing services infrastructure similar to the embodiments illustrated above with respect to a digital cable network. For example, digital cable network 1030 contains CPSI 1035, DSL network 1040 contains HPSI module 1045, wireless network 1050 contains HPSI module 1055, ISP gateway 1060 contains HPSI module 1065, and digital satellite network 1070 contains HPSI module 1075. In this manner, push-printing by third-party merchants 1002 through 1004 can be supported on a variety of different networks for sending print jobs to the home users on those networks.

The invention has been described with respect to particular illustrative embodiments. It is to be understood that the invention is not limited to the above-described embodiments, and various changes and modifications may be made by those of ordinary skill in the art without departing from the spirit and scope of the invention.

What is claimed is:

1. A method for transmission of print data, the method comprising the steps of:

generating the print data by an internet application;

calculating, by an intermediary server, a payment amount based on parameters for printing the print data designated from the internet application;

negotiating, between the intermediary server and the internet application, the calculated payment amount;

executing a process of providing the payment from the internet application to the intermediary server;

issuing a token to the internet application; and sending the print data with the token from the internet application to a remote print server for printing on a printer.

2. A method according to claim 1, wherein the internet application resides on a first network and a home access device resides on a second network, and wherein the remote print server resides on the second network and is in communication with the first network.

3. A method according to claim 2, wherein the second network is any of a digital cable network, a wireless data network, a data network, and a digital satellite network.

4. A method according to claim 3, wherein the home access device is any of a set-top box, a residential gateway, and a personal computer.

5. A method according to claim 1, wherein the internet application is a world wide web application.

6. A method according to claim 2, wherein the step of issuing the token includes the intermediary server providing the internet application with an address corresponding to a location of the home access device on the second network.

7. A method according to claim 1, wherein the parameter is any of a number of pages to be printed on the printer, a type of paper to be used by the printer to print the print data, information relating to options and capabilities of the printer, and a print made of the printer for printing the print data.

8. A method according to claim 1, wherein the payment is transferred from the intermediary server to a user of a home access device.

9. A method according to claim 2, wherein the sending step includes sending the print data from the internet application to the remote print server over the first network, and then from the remote print server to the home access device over the second network.

10. A method according to claim 2, wherein the sending step includes sending the print data from the internet application to the intermediary server over the first network, from the intermediary server to the remote print server over the first network, and from the remote print server to the home access device over the second network.

11. A method according to claim 2, wherein the first network is any of a data network, internet and world wide web.

12. A method according to claim 2, wherein the first network provides for secure communication by use of a secure protocol.

13. A method according to claim 1, wherein the printer is any of an ink jet printer, an ink bubble jet printer, a laser printer and a coupon printer.

14. A method according to claim 1, wherein the print data relates to any of sales information, a coupon financial information and a billing statement.

15. A method according to claim 1, wherein the payment is provided from the internet application to the intermediary server electronically.

16. A method according to claim 1, wherein the payment is provided from the internet application to the intermediary server after the print data is transmitted to a home access device.

17. A method for according to claim 1, further comprising the steps of:

verifying, by the remote print server, whether the token is authentic;

permitting a transmission of the print data to a home access device, if the token is authentic; and prohibiting the transmission of the print data to the home access device, if the token is not authentic.

18. An apparatus for transmission of print data from an internet application to a home access device having a printer connected thereto, the home access device being connected to a remote print server which controls print data transmission, comprising:

a program memory that stores process steps executable to perform a method according to claim 1; and a processor that executes the process steps stored in said program memory.

19. Computer-executable process steps stored on a computer readable medium, said computer-executable process steps for transmission of print data from an internet application to a home access device having a printer connected thereto, the home access device being connected to a remote print server which controls print data transmission, said computer-executable process steps comprising process steps executable to perform a method according to claim 1.

20. A computer-readable medium which stores computer-executable process steps, the computer-executable process steps for transmission of print data from an internet application to a home access device having a printer connected thereto, the home access device being connected to a remote print server which controls print data transmission, said computer-executable process steps comprising process steps executable to perform a method according to claim 1.

21. A method for initiating transmission of print data, the method comprising the steps of:

generating the print data;

negotiating, between an intermediary server and an internet application, a payment amount calculated according to parameters for printing the print data designated from the internet application;

sending the payment to the intermediary server;

receiving a token from the intermediary server; and sending the print data with the token to a remote print server.

* * * * *